US005171329A

United States Patent [19]

Lin

[11] Patent Number: 5,171,329

[45] Date of Patent: Dec. 15, 1992

[54] METHOD FOR MANUFACTURING A CANDLE

[75] Inventor: Kuo-Lung Lin, 2nd Floor, No. 9, Lane 56, Shih Chien Street, Pei Tou District, Taipei, Taiwan

[73] Assignees: Kuo-Lung Lin; Wen-Chi Chen, both of Taipei, Taiwan

[21] Appl. No.: 73,810

[22] Filed: Oct. 9, 1991

[51] Int. Cl.$^5$ .......................... B29C 39/10; C11C 5/00

[52] U.S. Cl. ...................................... 44/275; 264/275; 264/330; 431/288

[58] Field of Search ............... 431/324, 323, 320, 288; 264/275, 330; 44/275

[56] References Cited

U.S. PATENT DOCUMENTS

| | | | |
|---|---|---|---|
| 3,886,252 | 5/1975 | Eker et al. | 264/225 |
| 4,002,706 | 1/1977 | Pretorius | 264/13 |
| 4,134,718 | 1/1979 | Kayfetz et al. | 431/323 |
| 4,507,077 | 3/1985 | Sapper | 431/288 |
| 4,608,011 | 8/1986 | Comstock | 431/324 |
| 4,614,625 | 9/1986 | Wilson | 264/112 |
| 4,759,709 | 7/1988 | Luken, Jr. et al. | 431/288 |
| 4,855,098 | 8/1989 | Taylor | 264/330 |

FOREIGN PATENT DOCUMENTS

| | | | |
|---|---|---|---|
| 58-217597 | 12/1983 | Japan | 44/275 |
| 7184 | of 1836 | United Kingdom | 44/275 |
| 2317 | of 1853 | United Kingdom | 44/275 |
| 2557 | of 1854 | United Kingdom | 44/275 |
| 212 | of 1857 | United Kingdom | 44/275 |

*Primary Examiner*—Jan H. Silbaugh
*Assistant Examiner*—Brian J. Eastley
*Attorney, Agent, or Firm*—Browdy & Neimark

[57] ABSTRACT

A method for manufacturing a candle, wherein the butter oil is added to a solidified oil and mixed therewith to become solidified and form a wax-like state of fat which serves as the material of a candle by means of technical temperature and dissolving degree control; when the mixture is burned, no smoke or toxic particles are produced and an odor is released; the butter oil (a hundred percent pure vegetable oil) includes the following components: coconut oil, palm oil, palm olein and hydrogenate of palm oil, etc.; the as paimitic thereof is 0.1% at most, the melting point is within 35° −37° C.; emulsifier is added therein and the flavor is like butter; the additives are citric acid BHA and BHT β-cartene; the specification of the solidified oil is as follows: A.V. is below 0.5, I.V. is below 2.0, S.V. is 195-198, melting point is 60° C+1° C. and water and impurity are below 0.1%.

6 Claims, No Drawings

METHOD FOR MANUFACTURING A CANDLE

BACKGROUND OF THE INVENTION

The present invention relates to a method for manufacturing a candle, which eliminates the shortcomings existing conventional candle manufacturing method in which a petrolic chemical material is used for making candle. The present invention employs a mixture of butter oil and solidified oil to produce a candle which is burned without releasing smoke and toxic particles and can be burned with an odor released. Therefore, the drawbacks of conventional candles, such as black smoke, waste gas and strange smell can be eliminated.

A candle is a widely used article for illumination for many years. At present, although many advanced illuminating devices are used, a candle is still popularly used for decoration or on a special situation such as a holiday.

A conventional candle is made from wax material. However, such candles will emit a smoke and produce a bad smell when burning. Many people can not accept such smell. Also, a small amount of toxic particles will be created when the candle burns. These particles may affect the health of a human body when breathed in.

Moreover, in India, Nepal, Tibet and other places believing in Buddhism, the butter oil is always used to manufacture a candle. However, such butter oil is in a liquid state and is apt to attach to a hand and may easily slip and contaminate the estrade, offering, etc.

Therefore, an improved method for manufacturing a candle which is solidified and easy to be carried without attaching to a hand and slipping and which can be used in a sanitary manner is needed.

SUMMARY OF THE INVENTION

It is a primary object of this invention to provide a candle which can be burned without producing smoke and toxic particles, and which can be burned with an odor released.

It is a further object of this invention to provide a method for solidifying butter oil so that the butter oil can be carried easily without attaching to the hand, slipping and may be used sanitarily.

According to the above objects, the present method for manufacturing a candle is performed in such a manner that the butter oil is solidified to serve as a material of the candle, wherein the butter oil (a hundred percent pure vegetable oils) includes the components as follows: coconut oil, palm oil, palm olein and hydrogenate of palm oil, etc. The as paimitic is 0.1% at most and the melting point is within 35°-37° C. An emulsifier is added therein and the flavour is like butter. The additives are citric acid (butylated hydroxyanisole) and (butylated hydroxytoluene) β- carotene.

The above butter oil is added to a solidified oil and mixed therewith to become solidified. The specification of the solidified oil is as follows: A.V. is below 5.0, I.V. is below 2.0, S.V. is 195-198, melting point is 60° C.+1° C. and water and impurity are below 0.2%. The above butter oil mixed with the solidified oil will become solid by means of technical temperature and dissolving degree control. The mixture will melt when heated and absorbed by a wick to thereafter burned continuously. When the burning of the mixture proceeds, no smoke and toxic particles are produced and a butter odor is released.

DETAILED DESCRIPTION OF THE PREFERRED EMBODIMENT

The following is an embodiment of the present invention.

When manufacturing, the butter oil is first made according to the following list:

| Butter oil details | |
|---|---|
| The components of the oil mixture (one hundred precent pure vegetable oils): | |
| A. Coconut oil | |
| B. Palm oil | |
| C. Palm olein | |
| D. Hydrogenate of palm oil | |
| Characteristics: | |
| As Paimitic | 0.1% at most |
| Melting point | 35° C.-37° C. |
| Emulsifier | addition |
| Flavour | butter |
| Additive: | |
| Citric acid BHA | |
| BHT β-Carotene | |

The solidified oil must have the following specification so as to mix with the butter oil and form a solid state of oil by means of technical technical temperature and dissolving degree control:

1. A.V. (Acid Value) below 0.5
2. I.V. (Iodine Value) below 2.0
3. S.V. (Saponification Value) 195-198
4. M.P. (Melting Point) 60° C.+1° C.
5. Water and impurity below 0.2%

After the solidified oil is mixed with the butter oil with the aforesaid components, they will solidify to form a candle. Also, it can be evidenced by the burning state that no smoke will be produced during the burning. This is a great advantage over the prior art. Moreover, a special butter odor is released when burning and no toxic particles are dispensed.

In the above embodiment, the more pure the compound is, the smaller the change in melting point will be. However, both natural oil and processed oil will not possess an obvious melting point due to complex compositions and will have a range of melting points. Generally, an oil with large range of melting points can serve as the butter oil. With respect to the density of the fat, the density of a solid state of fat and that of a liquid state of fat are different. When the temperature rises, a part of the solid fat melts and thus the volume of the whole sample will increase in proportion thereto, i.e., the increment of sample volume is in proportion to the ratio of the existing liquid fat. By means of this relationship, the solid-liquid ratio or solid fat index, SFI; solid content index, SCI can be estimated from the volume increment. A dilatometer is often used to measure the solid-liquid ratio. When the specific volume is plotted on the y-axis against the temperature on the x-axis, an ascending sigmoidal curve is observed. An extrapolated line portion is an external insertion of the liquid and solid fat specific volume during temperature variation. The resulting graph shows the change of specific volume during temperature variation. When the temperature rises to a certain value, the specific volume is X (specific volume is the reciprocal of the density) and then the possession of solid fat is $A/B \times 100\%$ while the possession of the liquid fat is $(B-A)/B \times 100\%$. For these formulas, X is the particular point on the graph, B is the distance between the extrapolated lower and upper lines of the sigmoidal curve and A is the distance between point X on the curve and the extrapolated upper line. Actually, because the variation of the specific volume in solid state is hardly measured, a line parallel to the liquid specific volume variation line is often presumed to be the solid specific volume variation line the facilitate the calculation and simplify the operation.

Through the above formula, the calculation of the mixing of the butter oil and solidified oil of this invention can be easily derived. Using the above method, the liquid-solid ratio can be controlled through the temperature variation. Therefore, the manufacturing method of this invention contains no difficulty. In addition, it is found that the mixing weight ratio of the butter oil to the solidified oil is preferably 5:3. In this condition, a solidified butter oil is obtained for continuous burning.

What is claimed is:

1. A method for manufacturing a candle comprising; mixing butter oil with solidified oil at a ratio from 5:3 to 3:5 to form a mixture and solidifying the mixture in the shape of a candle, wherein the butter oil contains: 50–58% palm oil, 30–35% coconut oil, 5–8% soybean oil, 5–8% cotton seed oil, 2% flavor and less than 0.1% palmitic acid, melting point 35°–37° C., emulsifier, butter smell, citric acid butylated hydroxyanisole, and butylated hydroxytoluene $\beta$-carotene; and, wherein the solidified oil contains 80–90% palm oil and 10–20% soybean oil with an acid value below 0.5, an iodine value below 2.0, a saponificiation value of 195–198, a melting point of 60°±1° C., with less than 0.2% of water and impurities.

2. The method of claim 1 further comprising; heating said butter oil to about 50° C. until melted, adding the solidified oil, heating and stirring the mixture to about 80° C. for about twenty minutes, purifying, deacidifying, scenting and coloring said mixture.

3. The method of claim 1 further comprising pouring said mixture into a mold when said mixture is about 75°–80° C., placing a wick into the mold and allowing said mixture to solidify at about 18°–22° C.

4. The method of claim 1 wherein the ratio of butter oil to solidified oil is about 3:5.

5. A candle produced by the process of claim 1.

6. A candle produced by the process of claim 3.

* * * * *